UNITED STATES PATENT OFFICE.

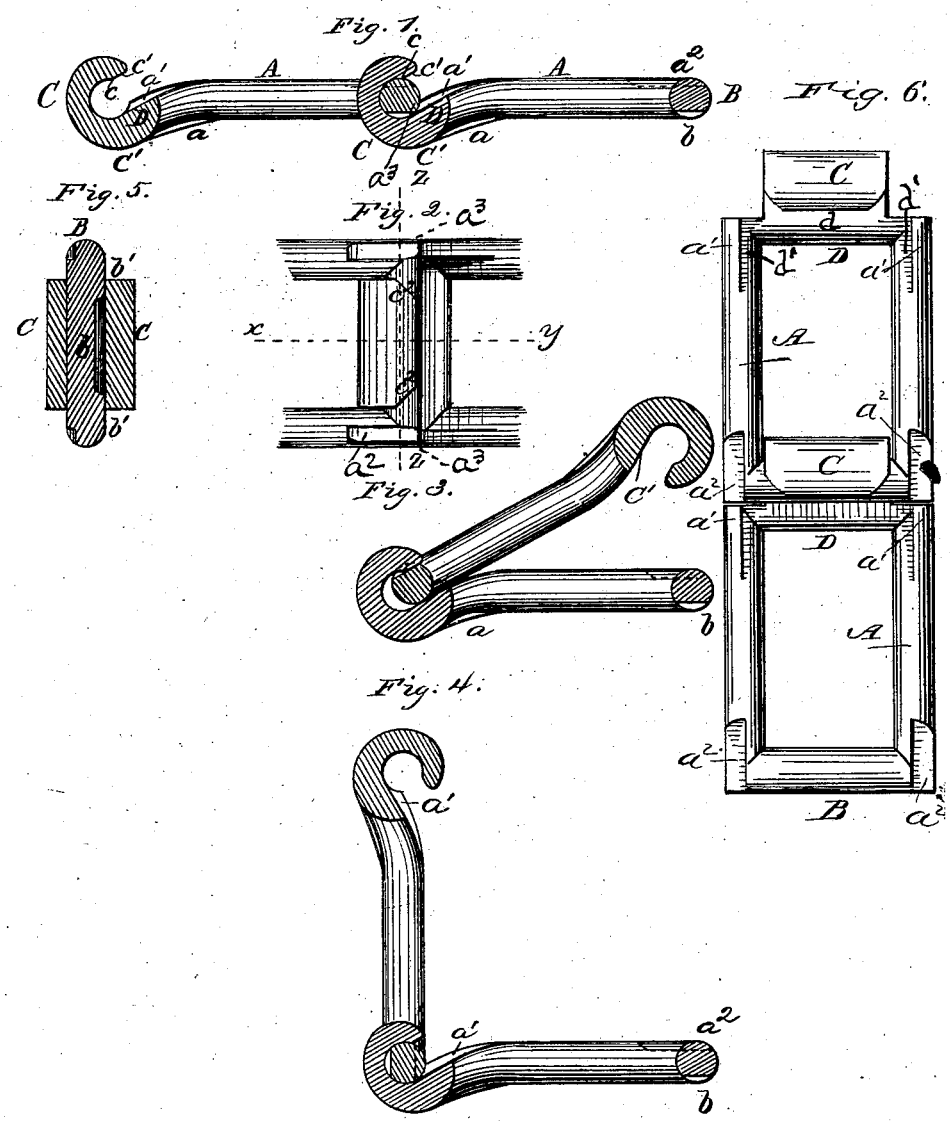

WILLIAM H. DICKEY, OF JACKSON, MICHIGAN.

DRIVE-CHAIN.

SPECIFICATION forming part of Letters Patent No. 294,373, dated March 4, 1884.

Application filed September 30, 1879.

*To all whom it may concern:*

Be it known that I, WILLIAM H. DICKEY, of Jackson, in the county of Jackson and State of Michigan, have invented certain new and useful Improvements in Chains; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a longitudinal section taken on line $x\,y$, Fig. 2. Fig. 2 is a plan or top view of portions of two connecting-links. Fig. 3 is a longitudinal section of the links in the position in which they are placed for coupling or uncoupling. Fig. 4 is a view with the links at substantially a right angle to each other. Fig. 5 is a transverse section on line $z\,z$, Fig. 2. Fig. 6 is a top or plan view of two connected links.

Each link is by preference a duplicate of every other link, and is so shown in the drawings, being composed of two side bars, A A, which may be round in cross-section, and are substantially of uniform size from end to end, an end bar, B, which is shown as being round in cross-section and of uniform diameter from end to end, except as hereinafter noted, and a hook, C, attached to the end bar D. Each side bar is bent near the end to which the hook is attached, as shown in Figs. 1, 3, and 4, its under side being by preference re-enforced by a rib and fin, $a$. The end bar B is recessed or cut away centrally upon its under side, as at $b$, leaving a portion, $b'$, of each end of full size and round in cross-section. By preference the side bars and end bars are round in cross-section throughout, with certain exceptions to be noted. The end bar D is flattened upon its upper surface, as at $d$, and the adjacent ends of the side bars are flattened or recessed to a plane, or thereabout, with the flattened portion $d$, so that the recessed or flattened portions extend not only the length of the end bar D, but about one-half way across the adjacent ends of the side bars, leaving upward-projecting stops, shoulders, or abutments $a'$ $a'$, for a purpose which will be explained. The opposite ends of the side bars are recessed or cut away, as at $a^2\,a^2$, to a depth and width about corresponding to the stops $a'\,a'$. The hook C C' projects from the end bar D, the shank portion C' being formed in substantially the same plane with the upper face of the flattened end bar D and the recessed portions of the side bars. The longitudinal opening or seat in the hook is substantially circular in cross-section, and is described upon a circle of the same diameter as the portions $b'\,b'$ of the end bar, so that these parts may fit closely to each other. The lip of the hook terminates in the flat surface $c'\,c'$, which is substantially parallel with the upper face of the shank C C' of the hook, for the purpose of forming a throat having parallel sides through which to pass the end bar of the adjacent link. This lip is also beveled, as indicated at $c^2\,c^2$, to enter the recess $b$ in the end bar.

Much difficulty has been experienced in operating this class of chains, owing to the fact that the looseness between the end bars and the hooks when the chain is straightened out permits the links to be rocked or twisted relative to each other, thus increasing rapidly the wear of the parts, and permitting an unsteady motion of the chain upon the sprocket-wheels over which they are ordinarily run. To prevent this undue looseness and consequent undesirable motion of the links relative to each other, I propose to construct the end bar with a comparatively short recess having beveled sides, and then bevel the lip on the hook to correspond therewith, so that while the end bar is free to pass through the throat of the hook when the links are in the position shown in Fig. 3, yet when the links are straightened out, as in Figs. 1, 2, and 6, those portions, $b'$ $b'$, of the end bar which are round in cross-section and are of full diameter are turned under the lip of the hook, as shown in Figs. 2, 5, and 6. Thus these portions of the end bars fit tightly within the hooks, and the ends $a^3\,a^3$ fit closely to the ends of the abutments or stops $a'\,a'$, whereby undue sidewise swinging or rocking of the chains is largely obviated.

It will be readily seen that when the links are in the position shown in Fig. 3 the abutments or stops $a'\,a'$ enter the corresponding recesses, $a^2\,a^2$, and slide through these recesses when the links are being coupled or uncoupled.

Referring to Fig. 4, it is seen that when the links are turned into the position there shown—as, for instance, when over a small sprocket-wheel or a tightening-pulley—the upper face of the end bar is nearly covered by the lip of the hook; hence there is but little tendency to wear the lip; and in case that part $e$ of the lip does become worn that portion $c'$ and the opposing flattened face $d$ will retain the form shown in the drawings, thus insuring that the throat of the hook shall remain practically unchanged, for which reason there is little or no danger of the chain becoming accidentally uncoupled even after the parts are considerably worn.

I do not in this case claim the invention which was patented to me in Letters Patent No. 229,104, dated June 22, 1880, which was granted upon an application filed as a division of this one.

What I claim is—

A chain-link having an end bar, D, which is flattened upon its upper face, as at $d$, with an open hook projecting therefrom, having at its opposite end an end bar adapted to enter a similar hook upon an adjacent link, and having side bars recessed at one end, as at $d'\ d'$, to the plane of the flattened part $d$ of the end bar, or thereabout, provided with stops $a'\ a'$ and recesses $a^2\ a^2$, to receive the stops when the links are turned into an unusual relative position for coupling or uncoupling.

In testimony that I claim the foregoing I have hereunto set my hand this 26th day of September, 1879.

WILLIAM H. DICKEY.

Witnesses:
JOHN S. BARKER,
H. H. DOUBLEDAY.